US008615526B2

(12) United States Patent
Sinha et al.

(10) Patent No.: US 8,615,526 B2
(45) Date of Patent: Dec. 24, 2013

(54) MARKUP LANGUAGE BASED QUERY AND FILE GENERATION

(75) Inventors: Arnab Sinha, Maharashtra (IN); Bharat Kumar Thakur, Maharashtra (IN)

(73) Assignee: Tata Consultancy Services Limited (IN)

( * ) Notice: Subject to any disclaimer, the term of this patent is extended or adjusted under 35 U.S.C. 154(b) by 198 days.

(21) Appl. No.: 13/164,930

(22) Filed: Jun. 21, 2011

(65) Prior Publication Data

US 2011/0314060 A1    Dec. 22, 2011

(30) Foreign Application Priority Data

Jun. 21, 2010    (IN) .......................... 1839/MUM/2010

(51) Int. Cl.
    *G06F 17/30*    (2006.01)
(52) U.S. Cl.
    USPC ........................................ 707/779

(58) Field of Classification Search
    USPC ........................................... 707/779
    See application file for complete search history.

(56) References Cited

U.S. PATENT DOCUMENTS

| | | | |
|---|---|---|---|
| 2003/0167456 A1* | 9/2003 | Sabharwal | 717/108 |
| 2009/0094216 A1* | 4/2009 | Hou et al. | 707/4 |
| 2009/0265608 A1* | 10/2009 | Molenaar | 715/234 |
| 2010/0299327 A1* | 11/2010 | Kiefer et al. | 707/736 |
| 2011/0071871 A1* | 3/2011 | Wong et al. | 705/7.22 |

* cited by examiner

*Primary Examiner* — Joshua Bullock
(74) *Attorney, Agent, or Firm* — Schwegman Lundberg & Woessner, P.A.

(57) ABSTRACT

An XML template having one or more nodes is received. Mapping information indicating an association of data and nodes of the uploaded XML template is obtained. Once the mapping is received, the structure of the XML template is determined. Based on the determined structure and the mapping provided, an XML based SQL query is generated. The generated SQL query can be executed to provide the XML document.

12 Claims, 5 Drawing Sheets

MARKUP LANGUAGE BASED QUERY AND FILE GENERATION

CLAIM OF PRIORITY

The present patent application claims the benefit of priority under 35 U.S.C. §119 to Indian Patent Application No. 1839/MUM/2010, filed Jun. 21, 2010, the entire contents of which is incorporated herein by reference in its entirety.

TECHNICAL FIELD

The present subject matter, in general, relates to systems and methods for generating a markup language based query, and, in particular, relates to systems and methods for generating an SQL XML based query and XML document.

BACKGROUND

Conventional systems store data in databases, typically in a relational manner. The type of information may vary depending on the businesses being handled. For example, a business may use a database to store information about its sales, clients, revenues, etc. Maintaining a database owing to the large volumes of data being stored becomes a complicated task. This is a significant hindrance to data integration within an organization or between business partners. However, these actions can be time consuming, complicated, expensive and undesirable for any organization.

Many such conventional systems use markup languages such as XML (eXtensible Markup Language) to represent the data stored in the databases. XML provides the ability to represent the data in a relational manner, based on the data which is stored in the database. Furthermore, it also allows an efficient mechanism for transferring or representing data stored in the databases. However, XML generation from the database is a difficult and complicated task and is extremely time consuming.

One way of generating an XML representation of the data stored in the database is by using queries, such as queries based on SQL. Such queries, referred to as SQL-XML query when executed provide an XML document or file as a representation of the data stored in the database. SQL-XML queries are manually coded. In cases where the amount of data is large, coding and testing of SQL-XML queries becomes burdensome and a complex activity.

SUMMARY

This summary is provided to introduce concepts related to an XML based query generation and XML document generation. This summary is not intended to identify essential features of the claimed subject matter nor is it intended for use in determining or limiting the scope of the claimed subject matter.

In one implementation, an XML template having one or more nodes is received. Mapping information indicating an association of data and nodes of the uploaded XML template is obtained. Once the mapping is received, the structure of the XML template is determined. Based on the determined structure and the mapping provided, an SQL-XML query is generated to be executed on an external database. The generated SQL query can be executed on the external database to provide the XML document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Conventional systems allow data to be stored using a variety of mechanisms. One such mechanism is based on markup language, like XML documents. The XML based documents allow storing, using, updating data in a smaller or a larger database.

Conventionally, XML documents representing data stored in a database, can be generated based on SQL-XML queries. The SQL-XML queries when executed, can fetch data stored in the database, to generate the XML document. The XML document or file thus generated includes the data fetched from the database, in a structured manner that can be based on the relationship amongst the data stored in the database.

The SQL-XML queries are usually manually coded. The manual coding of such queries becomes a cumbersome task when either large quantities of data have to be handled or when the data to be handled involves complex data representation. In such cases, the generation of the query using manual coding becomes extremely complicated, difficult, expensive and time consuming. Also, the time required for testing the SQL queries and the generated XML documents is very high. Furthermore, the SQL XML queries face performance issues and require frequent tuning for optimum XML generation.

Systems and methods for generating SQL XML queries and for generating XML documents are described herein. As will be shown in the following description, the development and the testing time associated with the SQL XML queries, based on the systems and methods as described, is considerably reduced. The SQL-XML queries as generated are then executed to generate the required XML document. It would be appreciated by a person skilled in the art, that types of queries, other than SQL-XML queries can also be used for generating XML documents or files for representing data stored in the database without deviating from the scope of the present subject matter.

To this end, a predefined XML template is received. In one implementation, the predefined XML template is associated with a schema. The XML template includes one or more elements or nodes that are interrelated to each other indicating a structure of the template. For example, the nodes can be structured in a hierarchical manner, with some nodes being child nodes to other root nodes, or some nodes being child nodes for a root node and root node for other child nodes. The nodes or elements in the XML template can be selected based on the desired XML document that is to be generated. The structure as defined by the XML template is mapped to the data stored in the database, for example based on mapping information. The mapping information, amongst other things, provides information indicating the mapping of the nodes of the XML template and the data stored in the database. In one implementation, the template can be based on any markup language.

Subsequently, the structure of the XML template is determined. In one implementation, the structure of the XML template can be determined by parsing through the XML template. The structure as obtained indicates the relationship between the different nodes of the XML template. Once the structure is obtained, one or more queries are generated based on the structure of the XML template and the mapping information. The generated queries can be executed on an external database to generate an XML document. In one implementation, the XML document can be subsequently validated based on a validation XML schema.

Figure 1:
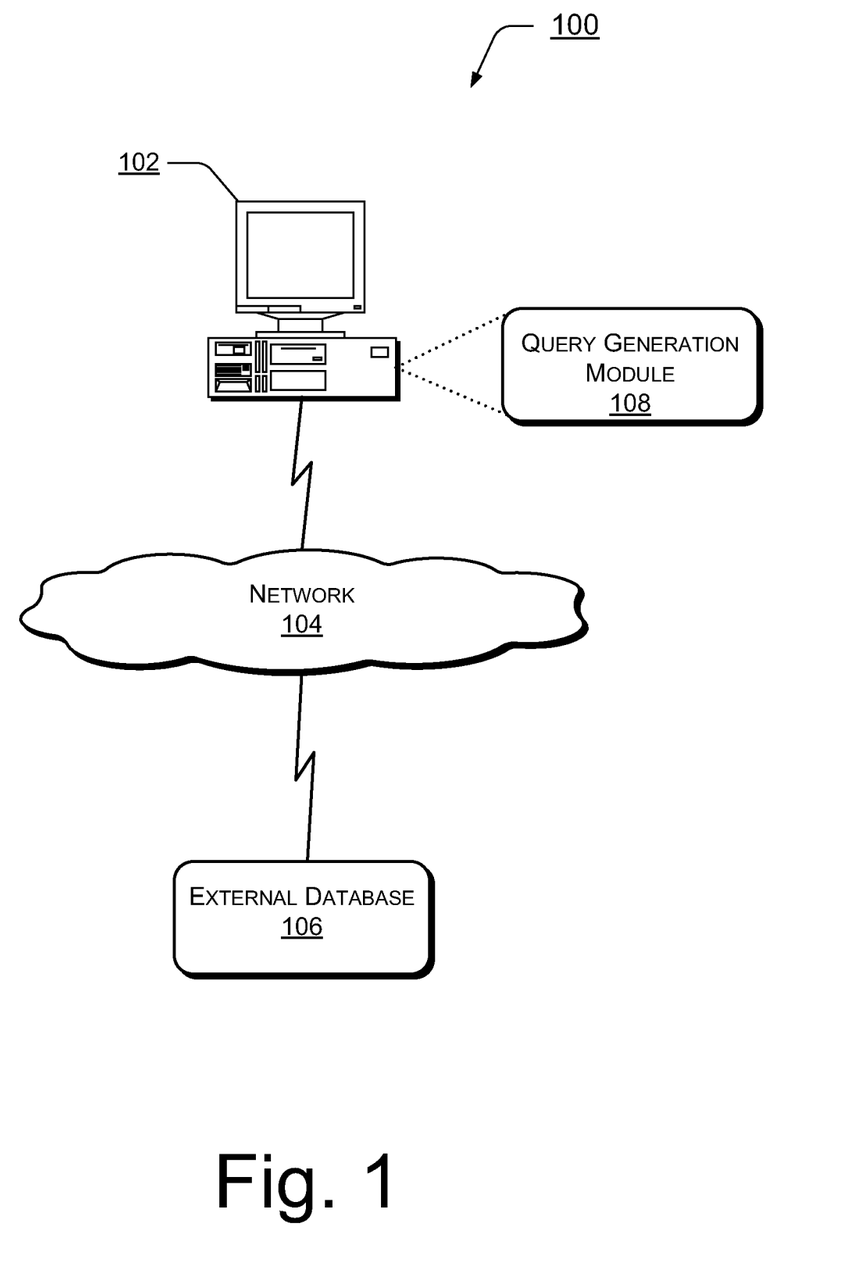
FIG. 1 illustrates an exemplary network environment for implementation of a system and/or method for generating an SQL XML query and a corresponding XML, in accordance with an embodiment of the present subject matter.

FIG. 1 shows an exemplary system 100 for generating a query and an XML document. The system 100 includes an XML generation system 102 for generating the queries and one or more XML documents. The XML generation system 102 communicates, through network 104, to an external database 106. The network 104 may be a wireless or a wired network, or a combination thereof. The network 104 can be a collection of individual networks, interconnected with each other and functioning as a single large network (e.g., the internet or an intranet). Examples of such individual networks include, but are not limited to, Local Area Networks (LANs), Wide Area Networks (WANs), and Metropolitan Area Networks (MANs).

The external database 106 can include one or more data storage devices (not shown in FIG. 1) that store data. In one implementation, the data stored in the external database 106 can be related to each other. In one implementation, the external database 106 is relational database. Furthermore, the external database 106 can also include one or more applications that allow data transfer between one or more computing entities.

It would be appreciated that the XML generation system 102 may be implemented as any of a variety of conventional computing devices, including, for example, a server, a desktop PC, a notebook or a portable computer, a workstation, a mainframe computer, a mobile computing device, etc. For example, in one implementation, system 100 can be a company network, including thousands of office PCs, and various external databases. Alternatively, in another possible implementation, system 100 can include a home network with a limited number of PCs and databases belonging to a single family.

In one implementation, the XML generation system 102 includes query generation module 108. The query generation module 108 generates an XML document based on one or more XML templates received, for example, by an end user. The XML template can be either specified manually by the end user, or can be fetched from a data repository storing such XML templates. The XML template specified by the end user indicates an outline structure or a framework on which the user-desired XML document would be based.

The XML template, based on which the XML document is to be generated, includes one or more elements or nodes. In one implementation, the nodes are specified by user-defined container tags. It would be appreciated that each of the nodes are indicative of the attributes associated with the data stored in the external database. For example, consider that the external database 106 includes a table listing the employees in a company. In such a case, the XML template can include nodes that are describe various attributes of the employee table, such as employee name, age, etc. It would be appreciated by a person skilled in the art that the nodes can be interrelated with each other. In one implementation, the nodes of the XML template are arranged in a hierarchical structure.

The XML generation system 102 further also receives mapping information, mapping the data stored in the external database 106 with the relevant portions of the XML template, i.e., mapping the data such as values corresponding to the entries in the employee table with the relevant node in the XML template. It would be appreciated that the mapping information can indicate the mapping between the nodes of the XML template and the data in various combinations, such as providing mapping between columns, rows, and rows, with the XML template.

Along with mapping the nodes of the XML template, the XML generation system 102 parses through the XML template to determine the structure of the XML template. It would be appreciated that the parsing of the XML templates can be performed either before or after mapping the nodes of the XML template with the data. As indicated previously, the nodes within the XML template are interrelated with each other. On obtaining the structure in which the nodes of the XML template are arranged, the XML generation system 102 generates one or more queries based on the determined hierarchical structure of the XML template and the mapping information. In one implementation, the query generation module 108 generates the queries based on structure of the XML template and the mapping information.

Once generated, the XML generation system 102 executes the queries on the external database 106. The queries when executed fetches data in XML format from the external database 106 and generates an XML document that is based on the structure of the XML template and which includes data fetched from the external database 106. In one implementation, the external database 106 may be an Oracle Relational Database.

In one implementation, the XML generation system 102 is also configured to validate the XML document generated by the execution of the SQL-XML queries. The XML generation system 102 parses the generated XML document to validate the document based on one or more rules, for example specified by the end user. In another implementation, the validation of the XML document is based on XML schema (XSD).

It would be appreciated that the described mechanism would substantially reduce the time required for developing and coding of XML documents. Furthermore, the time required for testing the generated XML document is also reduced.

Figure 2:
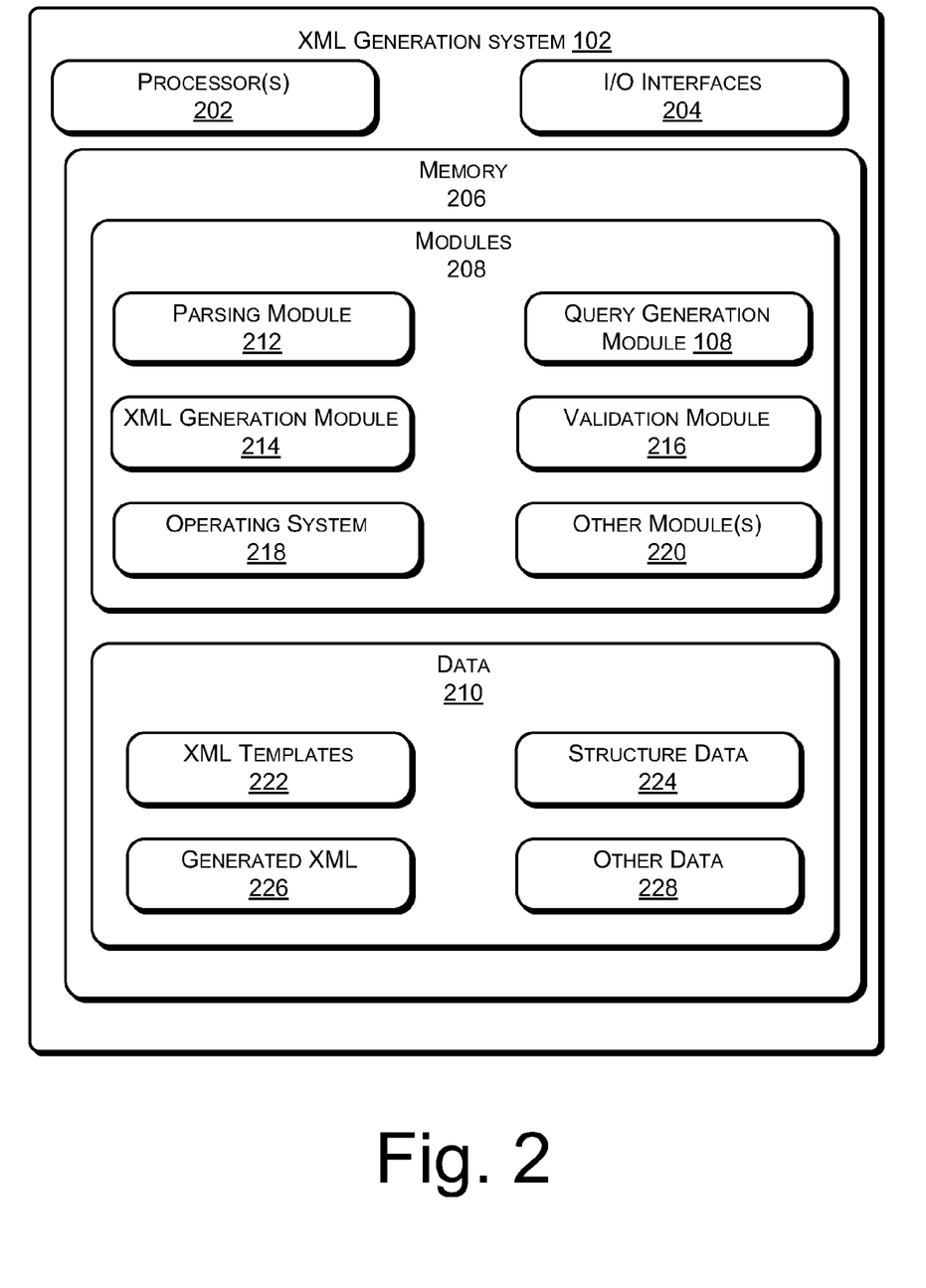
FIG. 2 shows an electronic device implementing the system as described in FIG. 1.

FIG. 2 illustrates relevant exemplary components of the XML generation system 102. The XML generation system 102 includes one or more processor(s) 202, I/O interface 204 and memory 206. The processor(s) 202 may include microprocessors, microcomputers, microcontrollers, digital signal processors, central processing units, state machines, logic circuitries, and/or any devices that manipulate signals and data based on operational instructions. Among other capabilities, the processor(s) 202 is configured to fetch and execute computer-readable instructions stored in memory 206.

The I/O interface(s) 204 may include a variety of software and hardware interfaces, for example, interface for peripheral device(s) such as data input devices, image or video capturing devices, audio input/output devices, etc. The peripheral device(s) connected through the interface(s) 204 facilitate identification and verification of one or more users accessing the XML generation system 102 for purposes such as viewing, modifying, sharing data objects, e.g., documents, data, and so on. The peripheral device(s) connected through the interface(s) 204 can capture interactions of the user accessing the data during interactions of the user with the system.

The memory 206 can include any computer-readable medium known in the art including, for example, volatile memory (e.g., RAM) and/or non-volatile memory (e.g., flash, etc.). The memory 206 also includes module(s) 208 and data 210. The data 210 serves amongst other things, as repositories for storing data that is either generated or utilized during the execution of one or more module(s) 208. The module(s) 208 further include the query generation module 108, a parsing module 212, an XML generation module 214, and a validation module 216. The module(s) 208 also include the operating system 218, and other module(s) 220. The data 210 includes for example, an XML template 222, structure data 224, generated XML 226, and other data 228.

The XML generation system 102 generates one or more XML documents based on XML templates. It would be appreciated that the XML templates can be either provided by a user or can be fetched from a repository storing a plurality of XML templates. In one implementation, the XML templates are stored in XML templates 222.

As mentioned before, the XML template describes the structure of the XML document that is to be generated. The XML template includes one or more nodes which are based on the attributes associated with the data stored in the external database. For example, the XML template can include nodes that are describe various attributes of an employee table, such as employee name, age, etc. In one implementation, the nodes of the XML template are arranged in a hierarchical structure.

Once the XML templates are obtained, the user can provide mapping information that maps one or more tables to the relevant nodes of the XML template. For example, for the employee table, fields such as employee name, age, etc., are mapped to the nodes of the XML template, such as the nodes defining the employee name, age, and so on. In one implementation, the mapping information is stored in other data 228.

Once the XML templates are obtained and the mapping information provided, the structure of the XML templates is determined. In one implementation, the parsing module 212 parses through the templates stored in the XML template 224 to determine the structure of the XML template. The parsing module 212 while parsing through the XML templates goes through each of the nodes present in the XML template to gather information indicating their structure. In one implementation, the parsing module 212 stores information indicating the structure of the XML templates as structure data, such as in XML template 224.

Once the structure data 224 is obtained, queries based on the mapping information from the other data 228 and the structure data 224 are generated. In one implementation, the query generation module 108 generates queries based on the mapping information and the structure data 224. In another implementation, the queries are based on SQL. In one implementation, the generated queries are stored in other data 228.

The generated queries are then gathered by the XML generation module 214. The XML generation module 214 executes the queries generated by the query generation module 108. In one implementation, the XML generation module 214 executes the queries on the external database 106. The XML generation module 214 on executing the queries generates the required XML document. The generated XML document can be stored in generated XML 226. It would be noted that the structure of the generated XML is similar to the structure of the XML templates that were uploaded into the XML generation system 102. Furthermore, the generated XML document, besides having the structure of the XML templates, also includes the values from the external database 106 that were mapped to the XML template.

The generated XML can also be validated. In one implementation, the validation module 216 performs validation of the generated XML document based on one or more rules, for example specified by the end user. In one implementation, the validation of the XML document is based on an XML schema (XSD). It would be appreciated that the validation of the generated XML document can be implemented based on any method conventionally known. While validating the generated XML document, the validation module 216 checks, whether the necessary elements and attributes are properly included in addition to checking for syntactical appropriateness i.e., the correctness of the XML structure, and for proper data type as desired. In one implementation, the validation module 216 is configured to parse through the entire generated XML document to detect all the errors. The errors that are detected by the validation module 216, are reported, say to the user of the system, at one go.

Figure 3:
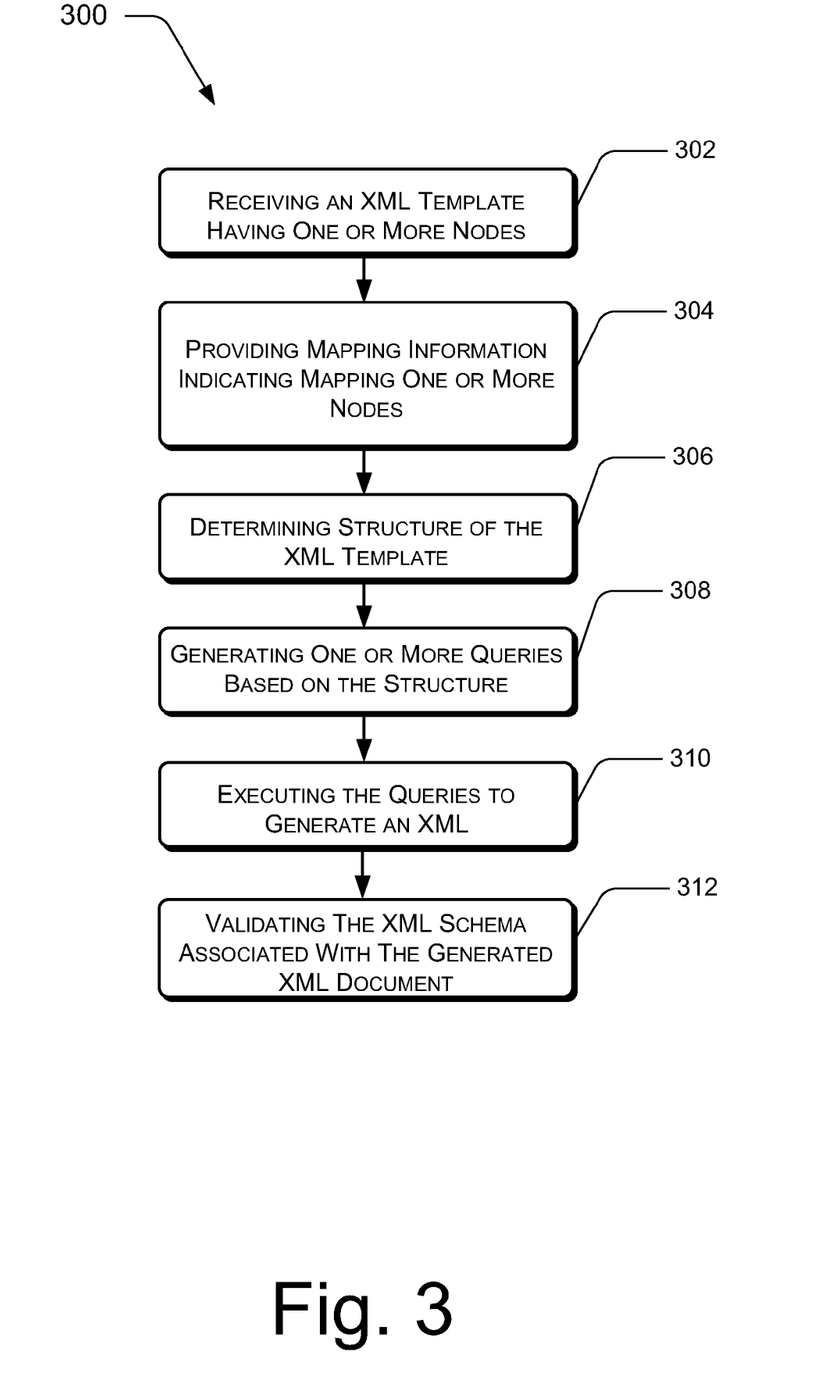
FIG. 3 illustrates an exemplary method of generating an SQL XML query and a corresponding XML, in accordance with an embodiment of the present subject matter.
Figure 4:
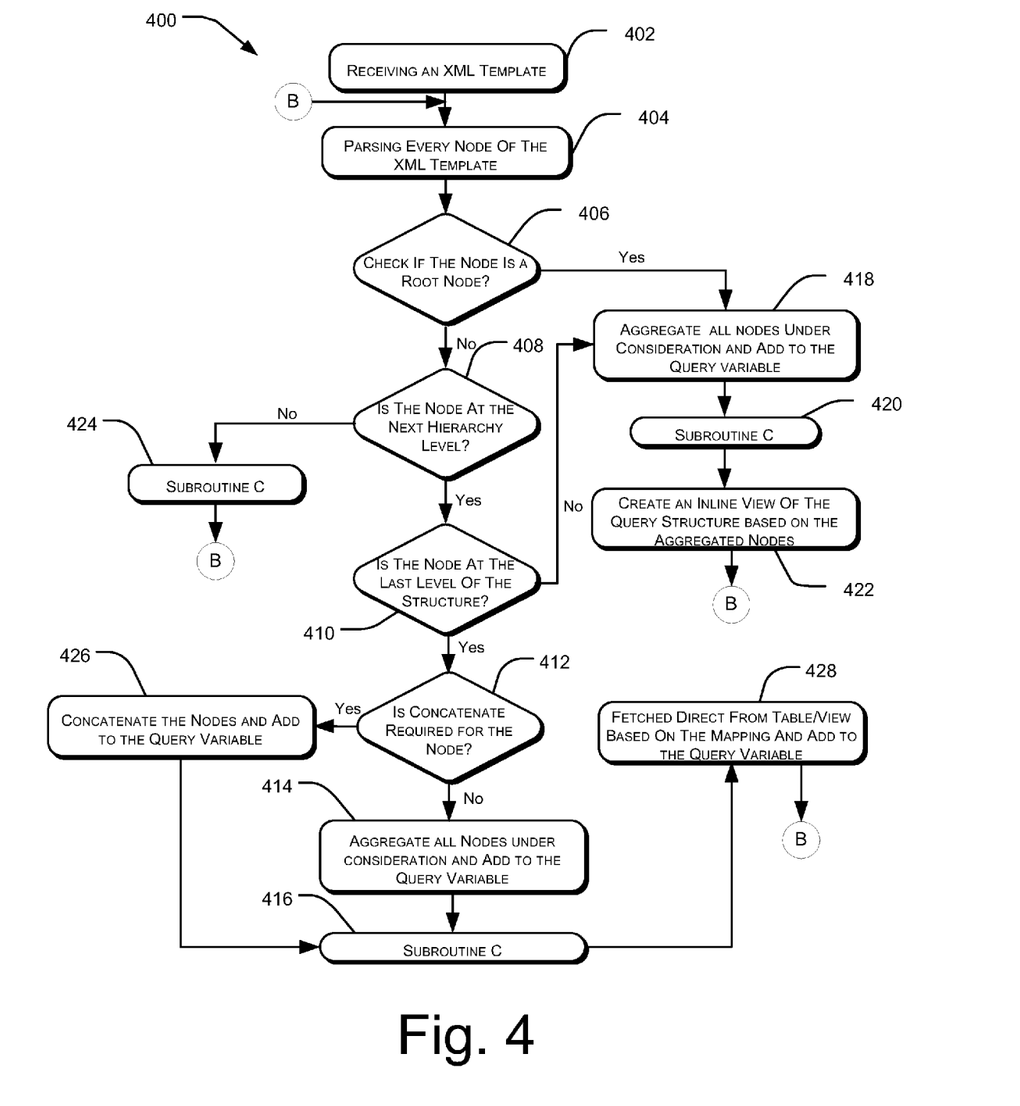
FIG. 4 illustrates an exemplary method for generating an SQL XML query based on the structure of an XML template.

The working of the XML generation system 102 is further explained in conjunction with FIG. 3 and FIG. 4 illustrate exemplary methods for generating an XML document based on one or more query, in accordance with one implementation of the present subject matter. The exemplary methods are described in the general context of computer executable instructions. Generally, computer executable instructions can include routines, programs, objects, components, data structures, procedures, modules, functions, etc., that perform particular functions or implement particular abstract data types.

The methods may also be practiced in a distributed computing environment where functions are performed by remote processing devices that are linked through a communications network. In a distributed computing environment, computer executable instructions may be located in both local and remote computer storage media, including memory storage devices.

Referring now to FIG. 3, an exemplary method 300 for generating an XML document is described. The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein.

At block 302, an XML template for generating a query, is received. For example, the XML generation system 102 receives an XML template. The XML template can be uploaded by a user or can be fetched by the query generation module 108. As indicated previously, the XML template indicates an outline structure or a format in which the required XML document is to be based. The XML template further includes one or more nodes based on the data fields of a table such as employee name, employee ID, department ID, etc.

At block 304, information mapping one or more nodes of the XML template to data, is provided. For example, the user can provide mapping information that maps one or more tables to the relevant nodes of the XML template. Considering the example of the employee table as described previously, fields such as employee name, age, etc., are mapped to the nodes of the XML template, such as the nodes defining the employee name, age, and so on. In one implementation, the mapping information is stored in other data 228.

At block 306, the structure of the XML template is determined. For example, the parsing module 212 parses through the XML template, such as templates stored in the XML template 222, to determine a hierarchical structure of the XML template. In one implementation, the parsing module 212 stores the information indicating the structure of the XML templates as structure data 224.

At block 308, a query is generated based on the structure data and the mapping information. For example, the query generation module 108 generates a query based on the structure of the XML template and the mapping information that associates one or more nodes of the XML templates with data stored, for example, in the external database 106. In one implementation, the query is based on SQL. The exemplary method of generating the SQL XML query in accordance with the present subject matter is explained in greater detail with respect to FIG. 4.

At block 310, the generated query is executed. For example, the XML generation module 214 executes the generated query on the external database 106 to generate the desired XML document. The generated XML document is structured based on the structure of the XML template.

At the block 312, the generated XML document is validated based on one or more rules or a schema. For example, the validation module 216 validates the generated XML document. In one implementation, the validation module 216 of the XML generation system 102, parses through the structure of the generated XML document and validates the generated XML document based on a provided schema by detecting errors. The errors occur due to non-conformance of the XML document with the provided schema. It would be noted that the schema can define one or more rules governing the structure, the data types associated with the structure, etc. Once detected, the validation module 216 displays the errors associated with the generated XML document at once.

FIG. 4 describes an exemplary method for generating one or more queries, in accordance with one implementation of the present subject matter. The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof.

At block 402, an XML template is received. The received XML template is associated with an XML structure. For example, the XML template may be an XML schema definition (XSD). In one implementation, the XML template is received by the XML generation system 102. In further implementation, when the XML template is received, a query variable may be created and initialized to null. For example, the query variable is a variable that indicates the queries generated at various stages while parsing every node of the structure. In an implementation, the query variable may be appended with the various portions of queries as and when they are generated in the complete process.

At block 404, all the nodes of the XML template are parsed. In one implementation, the parsing module 212, parses through each node of the XML template. The parsing module 212 parses through the XML structure associated with the XML template, identifying each of the nodes of the XML template as a root or a child node.

At block 406, a determination is made to check if the identified node is a root node or a child node. In one implementation, the parsing module 212 determines if the identified node is a root node or not. If the identified node is a root node ('Yes' path from the block 406), then the child nodes of the identified root node are aggregated and are added to the query variable (block 418). In one implementation, the query generation module 108 aggregates all the identified root nodes and their corresponding child nodes, and associates the same to the query variable. In another implementation, the query variable is stored in other data 228. The method then proceeds to block 420. At block 420, a subroutine, for example, subroutine C is called which redirects the flow to block 432.

At block 432, it is determined, whether the current node is a unique identifier or not. For example, a unique identifier may uniquely identify a specific row, for example in the external database 106. If at block 432 it is determined that the node is unique identifier ('Yes' path from the block 432), then the control proceeds to block 440.

At block 440, an XML attribute is generated and is appended to the query variable. In one implementation, the query variable is stored in the other data 228. The appended query is then returned at the block 442 which is further sent to the block 422 for further processing.

Returning to block 432, if it is determined that the node is not a unique identifier ('No' path from the block 432), then the control proceeds to block 434. At block 434, it is further determined, whether the current node is a single element or not. In one implementation, the single element node can be an isolated node having no child nodes or no further hierarchy associated with it. Therefore, if it is determined, that the current node is a single element ('Yes' path from the block 434), then the control proceeds to the block 436. At block 436, an XML element is generated based on the single element and appended to the query variable corresponding to a single element node.

However, if at block 434, it is determined that the current node is not a single element ('No' path from the block 434), then the control proceeds to the block 438. At block 438, an XML element is generated corresponding to a non-single element node and a corresponding query is appended to the query variable. As described in the present implementation, the queries generated at the block 436 and 438 are different with respect to each other. For example, the query generated at block 436 is for a single element node and the query generated at the block 438 is for a non-single element node. Further, the queries generated at block 436, or 438 or 442, are sent as input to the next block in the main process flow.

Returning to the block 420, the output from the subroutine C is a portion of XML query which is either corresponding to the query generated for a unique identifier, for example at block 440, or the query generated for a single element or a non single element node for example at the blocks 436 and 438 respectively. The method then proceeds to block 422.

At block 422, an inline view of the query generated till the stage of the current node is generated. For example, the inline view of the query, may provide a snapshot of the appended query variable until the stage of the current node. It would be appreciated that as more and more nodes are parsed, for example by the parsing module 212, more query portions would get added to the query variable and hence modifying the inline view at various stages. Once the inline view is created, the control proceeds back to block 404, for parsing the next node in the XML structure of the XML template.

Returning to the block 406, if the current node is not a root node ('No' path from the block 406), then the control proceeds to the block 408. At block 408, it is further determined, whether the current node is at a next level of hierarchy in the structure. If it is determined that the node is at the next level of hierarchy ('Yes' path from the block 410), then the control proceeds to the block 410. However, if at block 408, it is determined that the node is not at the next level of the hierarchy ('No' path from the block 408) then the control proceeds to the block 424, where the Subroutine C is called and the control is redirected to the block 432. In one implementation, the process is repeated for the subroutine C in a similar manner as described above. In further implementation of the present subject matter, the output from the subroutine C is similar to the one described above, and is sent to the block 424. The control then further proceeds to the block 404 for parsing the next node in the structure.

Further, returning to the block 408, if it is determined that the current node is at the next hierarchy level of the structure ('Yes' path from the block 408), then the control proceeds to the block 410. At block 410, it is further determined, whether the current node is at the last level of the hierarchy in the structure. If the current node is not at the last level of the hierarchy in the structure, then the control proceeds to the block 418, where all the child nodes of the current node are aggregated and the query is appended to the query variable. The control then further proceeds to the block 420 where the subroutine C is called. The control is then redirected to the block 432. In further implementation, the process for the subroutine C is repeated in a similar manner as described above. The output from the subroutine C is then sent as an input to the block 422 where an inline view of the query until this stage is generated. Further the control then proceeds to the block 404 for parsing the next node of the structure.

Further returning to the block 410, if it is determined that the current node is at the last level of the hierarchy in the structure, ('Yes' path from the block 410), then it is further determined, whether a concatenation of the node is required or not. In one implementation, the concatenation provides a transformation of a column representation to a row representation of the data from the database 106. If at block 410, it is determined, that a concatenation of the node is required ('Yes' path from the block 412), then the control proceeds to the block 426. At block 426, a concatenation query providing the transformation of a column representation to a row representation, is generated for concatenating the nodes and appended to the query variable. The control then proceeds to the block 416, where the subroutine C is called, and the process of the subroutine C is followed in a similar manner as described above. The output from the subroutine C is then sent as an input to the block 428.

At block 428 a value for the current node is fetched directly from the table/view of the database based on the mapping information provided by the user (block 428). Subsequently, the query variable fetches the value of the node directly from the table based on the mapping information provided by the user. The query variable is then appended with the direct fetch query. The control then proceeds to the block 404 for parsing the next node in the XML structure.

Returning to the block 412, if it is determined that the node does not require the concatenation ('No' path from the block 412), then the control proceeds to the block 414. At block 414 all the child nodes under the current node are aggregated and the query variable is appended with a corresponding aggregate query. The control then proceeds to the block 416 where the subroutine C is called. The process for the subroutine is followed in a similar manner as described above. The outputs from the subroutine C is then sent to the block 428 where the query variable fetches the value of the node directly from the table based on the mapping information provided by the user. The query variable is then appended with the direct fetch query. The control then proceeds to the block 404 for parsing the next node the XML structure.

Once all the nodes of the structure are parsed, the generated query is then returned to the user and is further executed on the database to generate the XML. In one implementation, the query generation module 108 executes the query generated at block 428 to further generate the desired XML document. In further implementation of the present subject matter, the XML document can be validated based on a defined schema, by the validation module 216.

CONCLUSION

Although implementations for generating one or more queries and an XML document have been described in language specific to structural features and/or methods, it is to be understood that the appended claims are not necessarily limited to the specific features or methods described. Rather, the specific features and methods are disclosed as exemplary implementations for generating the queries and the XML document.

We claim:

1. A computerized method in an eXtensible Markup Language (XML) generation system, for generating a Structured Query Language (SQL)-XML query, the computerized method comprising:
   receiving, by a query generation module, an XML template from an end user, wherein the XML template is an XML schema definition (XSD) indicating an outline structure of a target SQL XML document to be generated and wherein the XML template includes one or more nodes related based on attributes associated with data elements stored in an external database;
   receiving, by the query generation module, mapping information from the end user, wherein the mapping information is provided in the form of one or more XML mapping tables, table columns of which indicates a relationship between the one or more nodes of the XML template and the data elements stored in the external database;
   mapping, by the query generation module, based on the mapping information, the one or more nodes of the XML template with the table columns that are required at the one or more nodes;
   structuring and tagging, by a parsing module, the data elements from the one or more XML mapping tables as the one or more nodes of the XML template;
   parsing, by the parsing module, through the one or more nodes of the XML template to determine information indicating a structure of the XML template, wherein the structure of the XML template indicates a level of hierarchy and relationship between the one or mode nodes present in the XML template;
   creating, by the query generation module, a sub-query variable while parsing through the one or more nodes of the structure of the XML template, wherein the sub-query variable is a variable indicating queries generated at each hierarchy level of the XML template while parsing through the one or more nodes of the structure of the XML template;
   identifying, by the parsing module, whether at least one of the one or more nodes in the XML template is one of a root node, a single element, and a node at a next hierarchical level of the structure of the XML template;
   aggregating, by the query generation module, nodes present at a current hierarchy level and corresponding child nodes inside the current hierarchy level to the sub-query variable, based on the identification of the at least one of the one or more nodes;
   determining, by the query generation module, whether the at least one node is one of a unique identifier and a single element, the unique identifier uniquely identifies a specific row in the external database;

generating, by the query generation module, at least one of an XML attribute when the at least one node is the unique identifier and an XML element when the at least one of the one or more nodes is a single element;

aggregating, by the query generation module, at least one of the XML attribute and the XML element to the sub-query variable, based one the determination of the at least one of the one or more nodes;

creating, by the query generation module, an inline view at each level of the structure of the XML template, wherein the inline view has visibility at each sub level based on hierarchy;

creating, by the query generation module, a plurality of sub-query variables for each level of hierarchy; and generating, by the query generation module, the SQL-XML query by aggregating the plurality of sub-query variables.

2. The computerized method as claimed in claim 1, further comprises executing the query, by a markup document generation module, to generate an XML document, the XML document being associated with the data elements stored in the external database.

3. The computerized method as claimed in claim 1, further comprises validating, by the query generation module, the structure of the generated XML document.

4. The computerized method as claimed in claim 1, the identifying the at least one of the one or more nodes as a root node comprises aggregating the identified the at least one of the one or more nodes of the XML template based at least on a relationship among the one or more nodes of the XML template.

5. The computerized method as claimed in claim 1, further comprises:

identifying, by the parsing module, whether the at least one of the one or more nodes is at a last level of hierarchy for aggregating a last hierarchy level node to the sub-query variable and fetching value of the last hierarchy level node directly from a table/view of the external database based on the mapping information provided by the end user;

determining, by query generation module whether concatenation of the one of the one or more nodes is required, based on the identification; and concatenating the one of the or more nodes of the XML template based at least on the relationship between the one or more nodes.

6. The computerized method as claimed in claim 1, wherein the generated markup language document is an SQL-XML document.

7. A system for generating a Structured Query Language (SQL)-eXtensible Markup Language (XML) query, the system comprising:

a processor;

a parsing module, coupled to the processor, to:
structure and tag data elements from an external database as one or more nodes of an XML template based on mapping information provided by an end user, parse through the one or more nodes of the XML template to determine information indicating a structure of the XML template, wherein the structure of the XML template indicates a level of hierarchy and relationship between the one or mode nodes present in the XML template, identify whether at least one of the one or more nodes in the XML template is one of a root node, a single element, and a node at a next hierarchical level of the structure of the XML template; and a query generation module, coupled to the processor, to:
create a sub-query variable while parsing through the one or more nodes of the structure of the XML template, wherein the sub-query variable is a variable indicating queries generated at each hierarchy level of the XML template while parsing through the one or more nodes of the structure of the XML template, aggregate nodes present at a current hierarchy level and corresponding child nodes inside the current hierarchy level to the sub-query variable, based on the identification of the at least one of the one or more nodes, determine whether the at least one node is one of a unique identifier and a single element, the unique identifier uniquely identifies a specific row in the external database, generate at least one of an XML attribute when the at least one node is the unique identifier and an XML element when the at least one of the one or more nodes is a single element, aggregate at least one of the XML attribute and the XML element to the sub-query variable, based one the determination of the at least one of the one or more nodes, create an inline view at each level of the structure of the XML template, wherein the inline view has visibility at each sub level based on hierarchy, create a plurality of sub-query variables for each level of hierarchy; and generate the SQL-XML query by aggregating the plurality of sub-query variables.

8. The system as claimed in claim 7, wherein the system comprises a markup document generation module to execute the SQL-XML query to generate an XML document.

9. The system as claimed in claim 7, wherein the mapping is between columns of the external database with the one or more nodes of the XML template.

10. The system as claimed in claim 7, further comprises a validation module to detect errors present in the XML document.

11. The system as claimed in claim 10, wherein the validation module is configured to detect errors in the XML document based on an XML schema.

12. A non-transitory computer-readable medium having embodied thereon a computer program for executing a method comprising:

receiving, by a query generation module, an eXtensible Markup Language (XML) XML template from an end user, wherein the XML template is an XML schema definition (XSD) indicating an outline structure of a target Structured Query Language (SQL)-XML document to be generated, and wherein the XML template includes one or more nodes related based on attributes associated with data elements stored in an external database;

receiving, by the query generation module, mapping information from the end user, wherein the mapping information is provided in the form of one or more XML mapping tables, table columns of which indicates a relationship between the one or more nodes of the XML template and the data elements stored in the external database;

mapping, by the query generation module, based on the mapping information, the one or more nodes of the XML template with the table columns that are required at the one or more nodes;

structuring and tagging, by a parsing module, the data elements from the one or more XML mapping tables as the one or more nodes of the XML template;

parsing, by the parsing module, through the one or more nodes of the XML template to determine information indicating a structure of the XML template, wherein the structure of the XML template indicates a level of hierarchy and relationship between the one or mode nodes present in the XML template;

creating, by the query generation module, a sub-query variable while parsing through the one or more nodes of the structure of the XML template, wherein the sub-query variable is a variable indicating queries generated at each hierarchy level of the XML template while parsing through the one or more nodes of the structure of the XML template;

identifying, by the parsing module, whether at least one of the one or more nodes in the XML template is one of a root node, a single element and a node at a next hierarchical level of the structure of the XML template;

aggregating, by the query generation module, nodes present at a current hierarchy level and corresponding child nodes inside the current hierarchy level to the sub-query variable, based on the identification of the at least one of the one or more nodes;

determining, by the query generation module whether the at least one node is one of a unique identifier and a single element, the unique identifier uniquely identifies a specific row in the external database;

generating, by the query generation module, at least one of an XML attribute when the at least one node is the unique identifier and an XML element when the at least one of the one or more nodes is a single element;

aggregating, by the query generation module, at least one of the XML attribute and the XML element to the sub-query variable, based one the determination of the at least one of the one or more nodes;

creating, by the query generation module, an inline view at each level of the structure of the XML template, wherein the inline view has visibility at each sub level based on hierarchy;

creating, by the query generation module, a plurality of sub-query variables for each level of hierarchy; and generating, by the query generation module, an SQL-XML query by aggregating the plurality of sub-query variables.

* * * * *